(No Model.)
A. W. BROWNE.
DENTAL ENGINE.
No. 515,816. Patented Mar. 6, 1894.
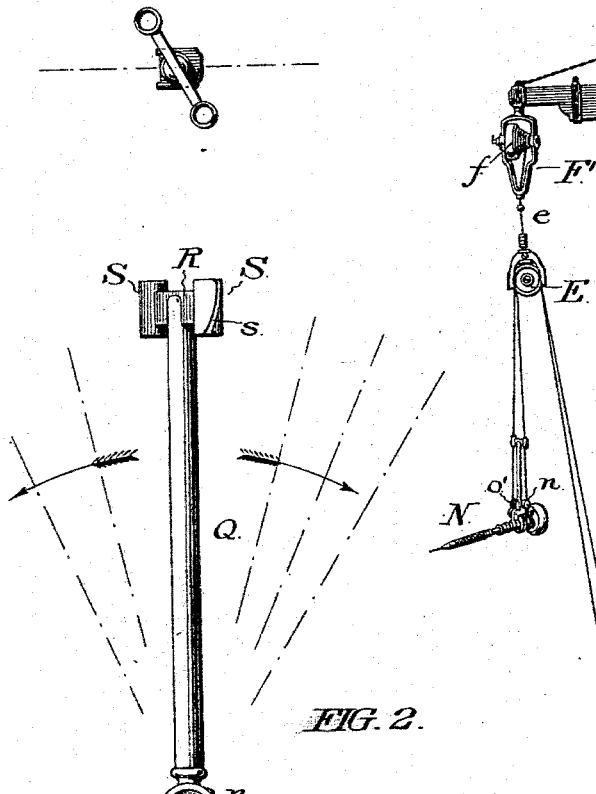
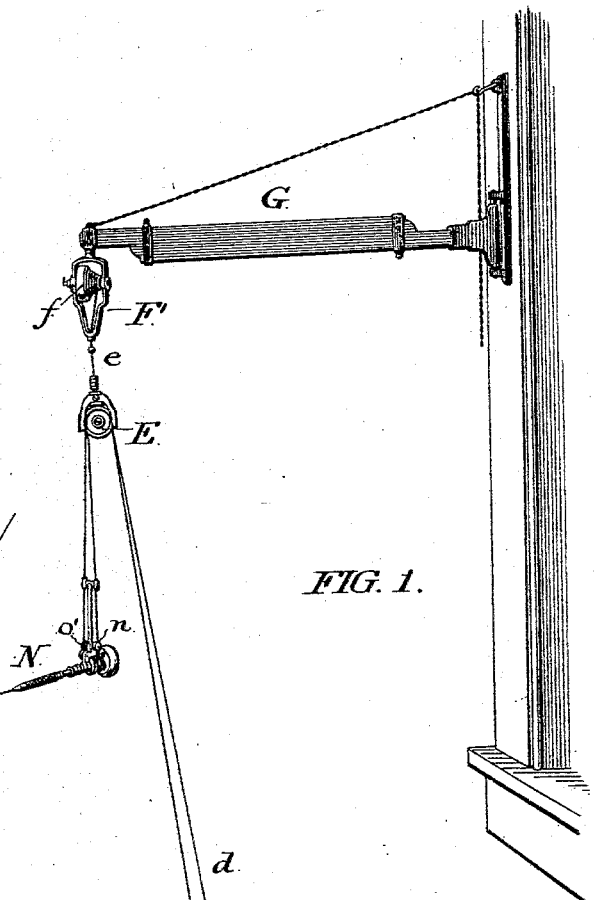
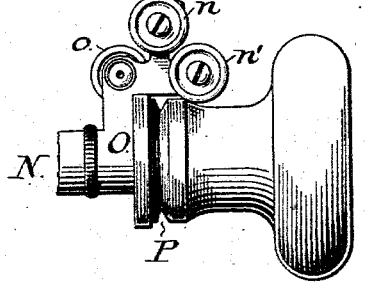
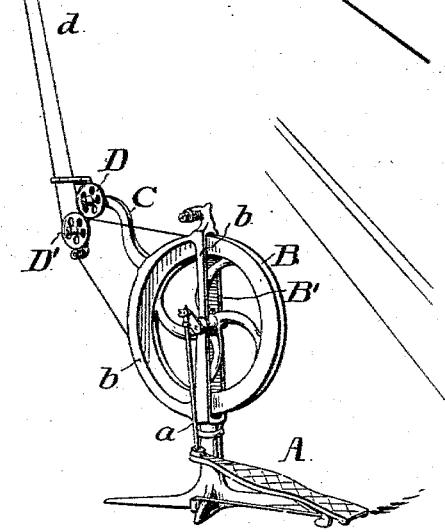
WITNESSES:
INVENTOR

United States Patent Office.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

DENTAL ENGINE.

SPECIFICATION forming part of Letters Patent No. 515,816, dated March 6, 1894.

Application filed April 17, 1893. Serial No. 470,774. (No model.)

*To all whom it may concern:*

Be it known that I, ARTHUR W. BROWNE, of Prince's Bay, in the county of Richmond and State of New York, have invented a certain new and useful Improvement in Dental Engines, of which the following is a specification.

My invention relates to a certain improvement, as hereinafter specifically claimed, applicable to that class of dental engines usually known as suspension engines.

In the accompanying drawings which show a suitable embodiment of my improvement in a suspension dental engine of the wall bracket type, Figure 1 is a view in perspective of the complete apparatus, on a scale much smaller than that of the remaining figures. Fig. 2 is a view in elevation showing the hand-piece frame, cord-guide, &c. Fig. 3 is a plan or end view of the cord-guide.

The engine is operated by suitable means, as for instance by the treadle A which imparts motion by way of pitman $a$ to a grooved driving wheel B mounted to rotate in a frame consisting of the frame standard B' and frame side $b$. A curved bracket-like arm C of the frame supports the cord guide pulleys D D', the latter being mounted upon the downwardly extended end of the bracket arm. The driving cord $d$ passes about the driving wheel and pulleys D D' as shown in Fig. 1, and thence about pulleys of a suspension pulley block E, the frame F of which is suspended by a cord $e$ from a fusee $f$ of well known construction, mounted in a frame F' hung at the outer end of a suitable extensible swinging bracket arm G, such for instance as shown in United States Letters Patent No. 286,704, dated October 16, 1883. From the suspension pulley block the driving cord passes by way of a cord guide and pulleys to a driven pulley on the rotary tool-actuating spindle of a hand-piece, as farther on to be explained.

The hand-piece N is of suitable well known construction, provided with the usual rotary spindle by way of which motion is imparted to the tool to be operated. The hand-piece frame O is provided with four cord guide pulleys in manner well known, and the driving cord passes as usual in one direction between two of these pulleys, $n\ n'$, then about the hand-piece pulley P for actuating the rotary spindle in the hand-piece, and next between the pulley $o$ and another pulley $o'$ in a line with the pulley $n$ and on a common shaft therewith. A cord guide is provided as follows:—A rod Q is connected with the hand-piece frame by being pivoted at its lower end to the shaft of the pulleys $n\ o'$, between these pulleys. The rod Q is provided at its upper end with a cross head R, oblique to the longitudinal axis of the hand-piece, terminating at its opposite ends in short guide tubes S, S, one in line with the cord passage between the pulleys $n\ n'$, and the other in line with the cord passage between the pulleys $o\ o'$. The guide tubes are each provided with an inclined longitudinal slot $s$, and are made of thin metal so as to spring or yield to permit of the insertion and withdrawal of the cord by pressure, and yet prevent its ready or accidental escape from the tubes by way of their slots.

The hand-piece frame and with it the hand-piece may be rocked about the guard Q freely without throwing the guard tubes out of alignment with the cord.

From the above description it will be seen that the cord can be placed in and withdrawn from the guards carried by the hand-piece frame, and that these guards while not interfering with the movements of the hand-piece counteract the tendency of the hand-piece frame to turn slightly in the direction in which the hand-piece is rotated, which turning movement of the frame, if permitted, would result in undue pressure of the driving cord against the flange of the pulley $n$ or $o'$, according to the direction of rotation of the hand-piece pulley, or even cause the driving cord to run off.

The cord guards may, if preferred, be arranged somewhat nearer to or farther from the hand-piece frame pulleys than shown; and an additional set of these guards may be employed, located on the rod Q in close proximity to said pulleys.

I claim as my invention—

The combination in a suspension dental engine, of the hand-piece, the hand-piece frame, the cord-guide pulleys mounted on said frame, the cord-guide rod having pivotal connection with the hand-piece frame, its cross head and the cord guides, substantially as and for the purpose set forth.

In testimony whereof I have hereunto subscribed my name.

ARTHUR W. BROWNE.

Witnesses:
SEYMOUR CASE,
IRVING DECKER.